Patented Jan. 8, 1946

2,392,437

UNITED STATES PATENT OFFICE 2,392,437

PRODUCTION OF QUINOLINIC ACID

Jacob van de Kamp, Westfield, N. J., and Meyer Sletzinger, New York, N. Y., assignors to Merck & Co., Inc., Rahway, N. J., a corporation of New Jersey No Drawing. Application October 26, 1943, Serial No. 507,746

3 Claims. (Cl. 260—295.5)

This invention relates to processes for the production of quinolinic acid.

One object of our invention comprises, inter alia, a new and improved method for the oxidation of quinoline to quinolinic acid.

In accordance with our invention, quinoline which has been heated with strong sulfuric acid is oxidized with manganese dioxide, in surfuric acid medium. We have discovered that manganese dioxide is a superior oxidizing agent for the production of quinolinic acid from the reaction product of quinoline and strong sulfuric acid, resulting in good yields of the desired product, and possessing definite and tangible advantages for use in commercial large-scale operations.

According to our invention, the oxidation step is carried out at a temperature of 150–175° C., and preferably at 165–175° C. The required temperature range can be maintained throughout the oxidation procedure by regulating the rate of addition of the manganese dioxide, as will more fully appear hereinafter.

Oxidation of the mixture of quinoline and strong sulfuric acid with manganese dioxide results in the production of quinolinic acid, in solution. Upon completion of the oxidation reaction, the oxidation product may be worked up for the recovery of the quinolinic acid. This may be accomplished, conveniently, by adjusting the pH of the oxidation solution to about 1.2, treating the same with an aqueous solution or suspension of a metal salt, such as cupric sulfate, for example, and recovering the precipitated copper derivative of quinolinic acid. The quinolinic acid may be recovered from its metal derivative by known methods.

Although we have specifically mentioned copper salts, and particularly cupric sulfate, as a suitable agent for treating the oxidation solution for the recovery of a copper derivative of quinolinic acid therefrom, other metal compounds, notably other copper compounds, such as copper oxide, are also suitable for this purpose.

The following examples illustrate methods of carrying out the present invention, but it is to be understood that these examples are given by way of illustration and not of limitation.

Example I 1000 gms. of oleum (containing 20% excess SO₃) is heated to 95–100° C., and 200 gms. of quinoline are added gradually over the course of about 30 minutes. During the addition of the quinoline, the temperature rises to about 170° C.; after all the quinoline is added, the temperature is allowed to drop, and is then held at 140° C. for about two hours.

The sulfonation mixture is diluted with 1600 cc. concentrated sulfuric acid, and heated to about 140° C. 1440 gms. of manganese dioxide (assaying 85 to 90%) are now added gradually. The temperature rises, and is maintained at 165–175° C. by regulating the rate of addition of manganese dioxide, the total time of addition being about two hours.

The temperature of the reaction mixture is allowed to drop to about 160° C., at which time water is added, slowly at first, and then more rapidly. 9600 cc. of water are added, bringing the temperature to about 90° C. The solution is filtered from some unreacted manganese dioxide after addition of a filter aid such as "supercel" (diatomaceous silica). About 14–15 liters of a clear amber-colored solution results.

Quinolinic acid may be recovered from this solution in the form of a copper derivative, according to known methods.

Example II 2100 gms. of sulfuric acid (sp. gr. 1.83) are heated to 140° C.; 100 gms. of quinoline are added during the course of about 5 minutes. The temperature rises to about 150° C., and the mixture is then heated to 160–170° C. for one hour. The mixture is cooled to 135° C., and 640 gms. of manganese dioxide (assaying 85–90%) are added gradually, the rate of addition being so regulated that the temperature is maintained at about 170° C. After the manganese dioxide is added, and the reaction mixture begins to cool, it is diluted with about 4800 cc. of water, and the quinolinic acid is recovered by known methods.

Modifications may be made in carrying out the present invention without departing from the spirit and scope thereof, and we are to be limited only by the appended claims.

We claim:

1. The process comprising oxidizing the product of reaction between quinoline and concentrated sulfuric acid, with manganese dioxide, in sulfuric acid medium, at a temperature of 165–175° C., and recovering quinolinic acid.

2. The process comprising heating together quinoline and concentrated sulfuric acid, adding manganese dioxide thereto at such a rate that the temperature is maintained at about 165–175° C., and recovering quinolinic acid from the reaction mixture.

3. The process comprising heating together quinoline and concentrated sulfuric acid, adding manganese dioxide thereto at such a rate that the temperature is maintained at about 170° C., and recovering quinolinic acid from the reaction mixture.

JACOB VAN DE KAMP.
MEYER SLETZINGER.